(12) United States Patent
Rao et al.

(10) Patent No.: US 11,870,484 B2
(45) Date of Patent: Jan. 9, 2024

(54) WIRELESS COMMUNICATION SYSTEM HAVING DUAL-BAND COEXISTENCE ARCHITECTURE

(71) Applicant: WISTRON NEWEB CORPORATION, Hsinchu (TW)

(72) Inventors: Chen-Mao Rao, Hsinchu (TW); Li-Yuan Chang, Hsinchu (TW); Yu-Fang Chang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 327 days.

(21) Appl. No.: 17/509,108

(22) Filed: Oct. 25, 2021

(65) Prior Publication Data

US 2022/0416836 A1  Dec. 29, 2022

(30) Foreign Application Priority Data

Jun. 25, 2021  (TW) .................................. 110123236

(51) Int. Cl.
*H04B 1/52* (2015.01)
*H04B 1/401* (2015.01)
*H04W 72/0453* (2023.01)

(52) U.S. Cl.
CPC ............... *H04B 1/52* (2013.01); *H04B 1/401* (2013.01); *H04W 72/0453* (2013.01)

(58) Field of Classification Search
CPC ...... H04B 1/401; H04B 1/52; H04W 72/0453
USPC .......................................... 370/329, 395, 364
See application file for complete search history.

(56) References Cited

U.S. PATENT DOCUMENTS

| 11,356,127 | B2 | 6/2022 | Hasnain |
| 11,476,824 | B2 | 10/2022 | Cai et al. |
| 2021/0184346 | A1 | 6/2021 | Wloczysiak |
| 2022/0109423 | A1* | 4/2022 | Guyette ................. H03H 9/568 |

FOREIGN PATENT DOCUMENTS

TW  201939908 A  10/2019

* cited by examiner

*Primary Examiner* — Dang T Ton
(74) *Attorney, Agent, or Firm* — McClure, Qualey & Rodack, LLP (57) ABSTRACT

A wireless communication system having a dual-band coexistence architecture is provided, and the system includes a processing circuit, a first transceiver, a first front-end module, a first switch circuit, a first filter, a second filter, a second switch circuit, a first antenna, a second transceiver, a second front-end module, a third switch circuit, a third filter, a fourth filter, a fourth switch circuit and a second antenna. The first filter and the second filter use a combination of a wideband filter and a narrowband filter, and the fourth filter and the third filter also use a combination of a wideband filter and a narrowband filter, so as to achieve the dual-band coexistence architecture.

12 Claims, 4 Drawing Sheets

| Confirming the designated channel used for communication with a user equipment and the designated frequency band corresponding to the designated channel | — S50 |

| Controlling the first switch circuit, the second switch circuit, the third switch circuit, and the fourth switch circuit to select one of the first pass band, the second pass band, the third pass band, and the fourth pass band according to the designated frequency band | — S51 |

FIG. 5

WIRELESS COMMUNICATION SYSTEM HAVING DUAL-BAND COEXISTENCE ARCHITECTURE

CROSS-REFERENCE TO RELATED PATENT APPLICATION

This application claims the benefit of priority to Taiwan Patent Application No. 110123236, filed on Jun. 25, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wireless communication system, and more particularly to a wireless communication system having a dual-band coexistence architecture.

BACKGROUND OF THE DISCLOSURE

Figure 1:
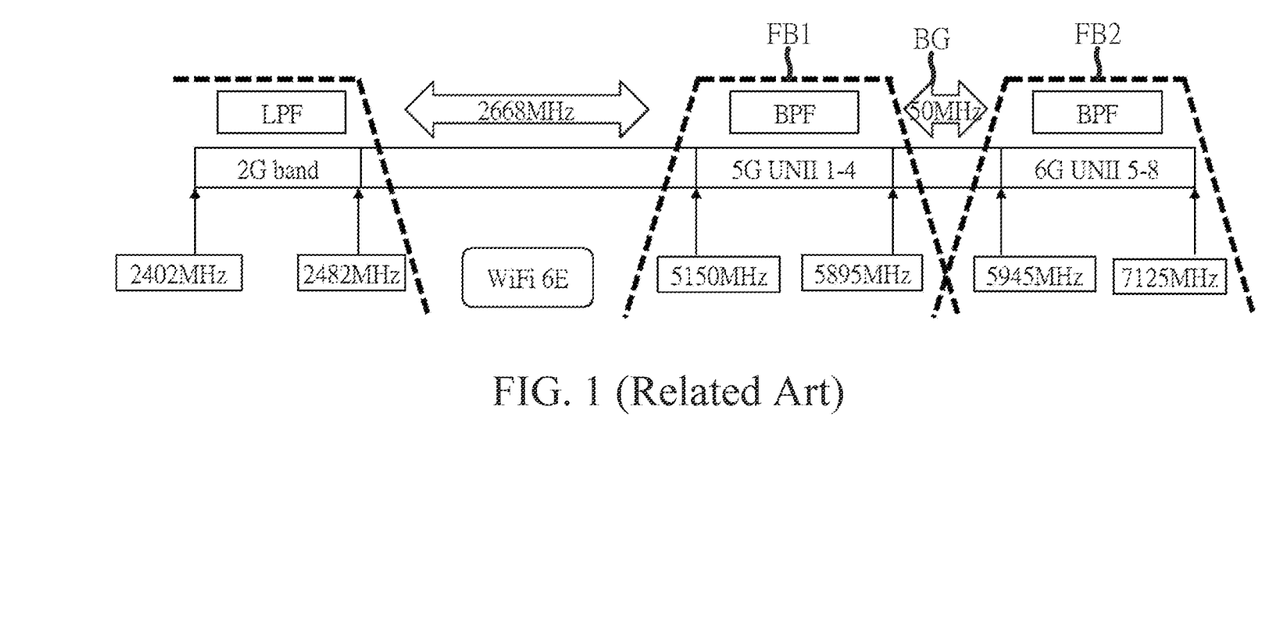
FIG. 1 is a schematic diagram of the 5G and 6G radio frequency bands that WiFi 6E needs to support.

Refer to FIG. 1, which is a schematic diagram of 5G and 6G radio frequency bands that WiFi 6E needs to support. As shown in FIG. 1, since the WiFi 6/6E product specification released by the enterprise AP side customer needs to support Unlicensed National Information Infrastructure (UNII)-4 in the 5G radio frequency. The band gap between the nearest pass bands of the 5G frequency band and the 6G frequency band would be only 50 MHz.

This means that it would be extremely difficult to achieve simultaneous support of 5G and 6G frequency bands under strict pass band spacing conditions. Generally speaking, it is necessary to achieve an attenuation value greater than 40 dB within the frequency range of 50 MHz, so as to avoid mutual interference when two pass bands coexist.

Traditionally, a single broadband filter is often used for design. However, its disadvantage is that it is difficult to achieve an attenuation value greater than 40 dB under a 50 MHz band gap.

Therefore, how to improve the filter architecture to avoid mutual interference when two pass bands coexist to overcome the above-mentioned shortcomings has become one of the important issues to be solved.

SUMMARY OF THE DISCLOSURE

In response to the above-referenced technical inadequacies, the present disclosure provides a wireless communication system having a dual-band coexistence architecture.

The present disclosure is to provide a wireless communication system having a dual-band coexistence architecture. The wireless communication system has a processing circuit, a first transceiver, a first front-end module, a first switch circuit, a first filter, a second filter, a second switch circuit, a first antenna, a second transceiver, a second front-end module, a third switch circuit, a third filter, a fourth filter, a fourth switch circuit, and a second antenna. The first transceiver is connected to the processing circuit. The first front-end module is connected to the first transceiver. The first switch circuit is connected to the first front-end module and the processing circuit. The first filter is connected to the first switch circuit and has a first pass band. The second filter is connected to the first switch circuit and has a second pass band. The first pass band has a lower frequency range than the second pass band. The first pass band and the second pass band are adjacent to jointly cover a first frequency band. The first switch circuit is controlled by the processing circuit to connect the first front-end module to the first filter or the second filter. The second switch circuit is connected to the first filter, the second filter and the processing circuit. The first antenna is connected to the second switch circuit. The second switch circuit is controlled by the processing circuit to connect the first antenna to the first filter or the second filter. The second transceiver is connected to the processing circuit. The second front-end module is connected to the second transceiver. The third switch circuit is connected to the second front-end module and the processing circuit. The third filter is connected to the third switch circuit and has a third pass band. The fourth filter is connected to the third switch circuit and has a fourth pass band. The third pass band has a lower frequency range than the fourth pass band, and the third pass band and the fourth pass band are adjacent to jointly cover a second frequency band. The second frequency band has a frequency range higher than the first frequency band. The third switch circuit is controlled by the processing circuit to connect the second front-end module to the third filter or the fourth filter. The fourth switch circuit is connected to the third filter, the fourth filter and the processing circuit. The second antenna is connected to the fourth switch circuit. The fourth switch circuit is controlled by the processing circuit to connect the second antenna to the third filter or the fourth filter. The first frequency band has a frequency range lower than that of the second frequency band. There is a band gap between the first frequency band and the second frequency band, the second filter has a first out-of-band attenuation value at a junction of the band gap and the second frequency band. The third filter has a second out-of-band attenuation value at a junction of the band gap and the first frequency band. The processing circuit is configured to execute a channel selection procedure, including: confirming a designated channel used for communication with user equipment and a designated frequency band corresponding to the designated channel; and controlling the first switch circuit, the second switch circuit, the third switch circuit, and the fourth switch circuit to select one of the first pass band, the second pass band, the third pass band, and the first pass band according to the designated frequency band.

One of the beneficial effects of the present disclosure is that the wireless communication system having a dual-band coexistence architecture provided by the present disclosure can realize the pass band bandwidth required by the dual-band coexistence architecture by using a combination of a wideband filter and a narrowband filter and the attenuation value of the cutoff band.

In addition, the wireless communication system with dual-band coexistence architecture provided by the present disclosure can support UNII-4, achieving an attenuation value greater than 40 dB under the condition that the pass band interval is only 50 MHz, thereby avoiding coexistence of 5G and 6G pass bands interfering with each other.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like. In addition, the term "connect" used herein refers to a physical connection between two elements, which can be a direct connection or an indirect connection.

Figure 2:
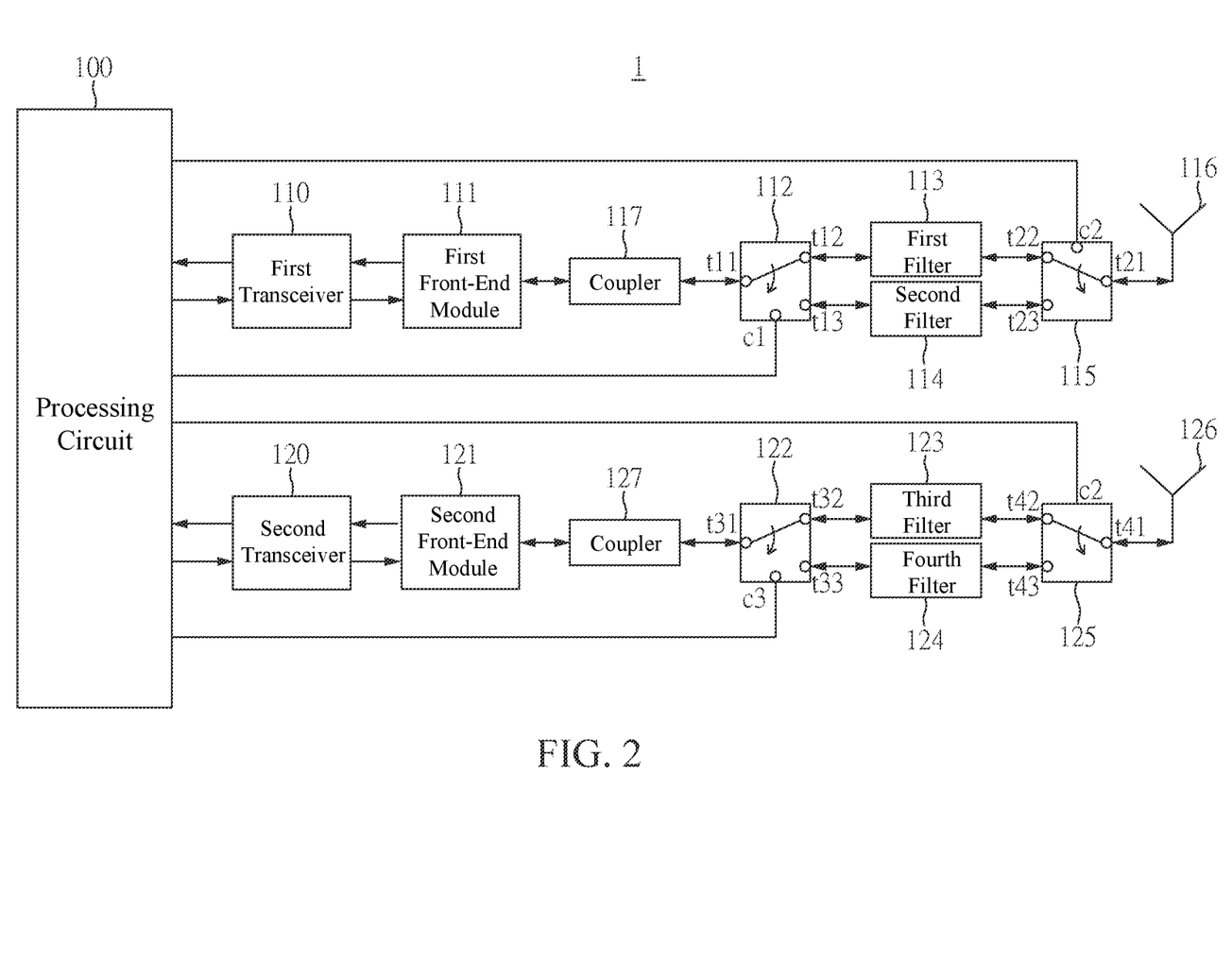
FIG. 2 is a functional block diagram of a wireless communication system according to an embodiment of the present disclosure.

FIG. 2 is a functional block diagram of a wireless communication system according to an embodiment of the present disclosure. Referring to FIG. 2, the embodiment of the present disclosure provides a wireless communication system 1 having a dual-band coexistence architecture. The system 1 includes a processing circuit 100, a first transceiver 110, a first front-end module 111, a first switch circuit 112, a first filter 113, a second filter 114, a second switch circuit 115, a first antenna 116, a second transceiver 120, a second front-end module 121, a third switch circuit 122, a third filter 123, a fourth filter 124, a fourth switch circuit 125 and a second antenna 126.

The processing circuit 100 may include, for example, one or more central processing unit (CPU) cores and one or more of the following: cache memory, low-dropout regulator (LDO), switch controller, serial interface (Such as SPI, I2C or general programmable serial interface subsystem), real time clock (RTC), timer counter (including interval timer and watchdog timer), general purpose TO, memory card controller (Such as SD/MMC or other similar), USB interface, MIPI interface and/or joint test access group (JTAG) test access port. The first transceiver 110 is connected to the processing circuit 100, and the first transceiver 110 is configured to operate in a 5 GHz wireless frequency band, and may be, for example, a transceiver circuit for transmitting or receiving signals in the 5 GHz frequency band.

The first front-end module 111 is connected to the first transceiver 110. The first front-end module 111 may include multiple radio chains operating in the 5G frequency band, including one or more RF devices, and may include up/down converters, power combiners or splitters, and programmable phase shifting and power amplifier (PA), low noise amplifier (LNA), and control and power management circuits.

The first switch circuit 112 is connected to the first front-end module 111 and the processing circuit 100. In this embodiment, the first switch circuit 112 can be connected to the first front-end module 111 through the coupler 117, but the present disclosure is not limited to this, and the coupler 117 is not necessary. The first switch circuit 112 can be controlled by the processing circuit 100 to connect the first front-end module 111 to the first filter 113 or the second filter 114, and the first switch circuit 112 can be, for example, a single pole double throw, SPDT) switch circuit.

The first filter 113 is connected to the first switch circuit 112 and has a first pass band PB1. The second filter 114 is connected to the first switch circuit 112 and has a second pass band PB2. The first filter 113 can be used to filter the transmitted signal from the first transceiver 110 or the received signal from the first antenna 116 with the first pass band PB1, and the second filter 114 can also be used to filter the second pass band PB2 The transmission signal from the first transceiver 110 or the reception signal from the first antenna 116.

Referring to FIG. 2 again, the second switch circuit 115 is connected to the first filter 113, the second filter 114, the processing circuit 100 and the first antenna 116. Similarly, the second switch circuit 115 can also be, for example, a single pole double throw (SPDT) switch circuit, and the second switch circuit 115 is controlled by the processing circuit 100 to connect the first antenna 116 to the first filter 113 or second filter 114.

Figure 3:
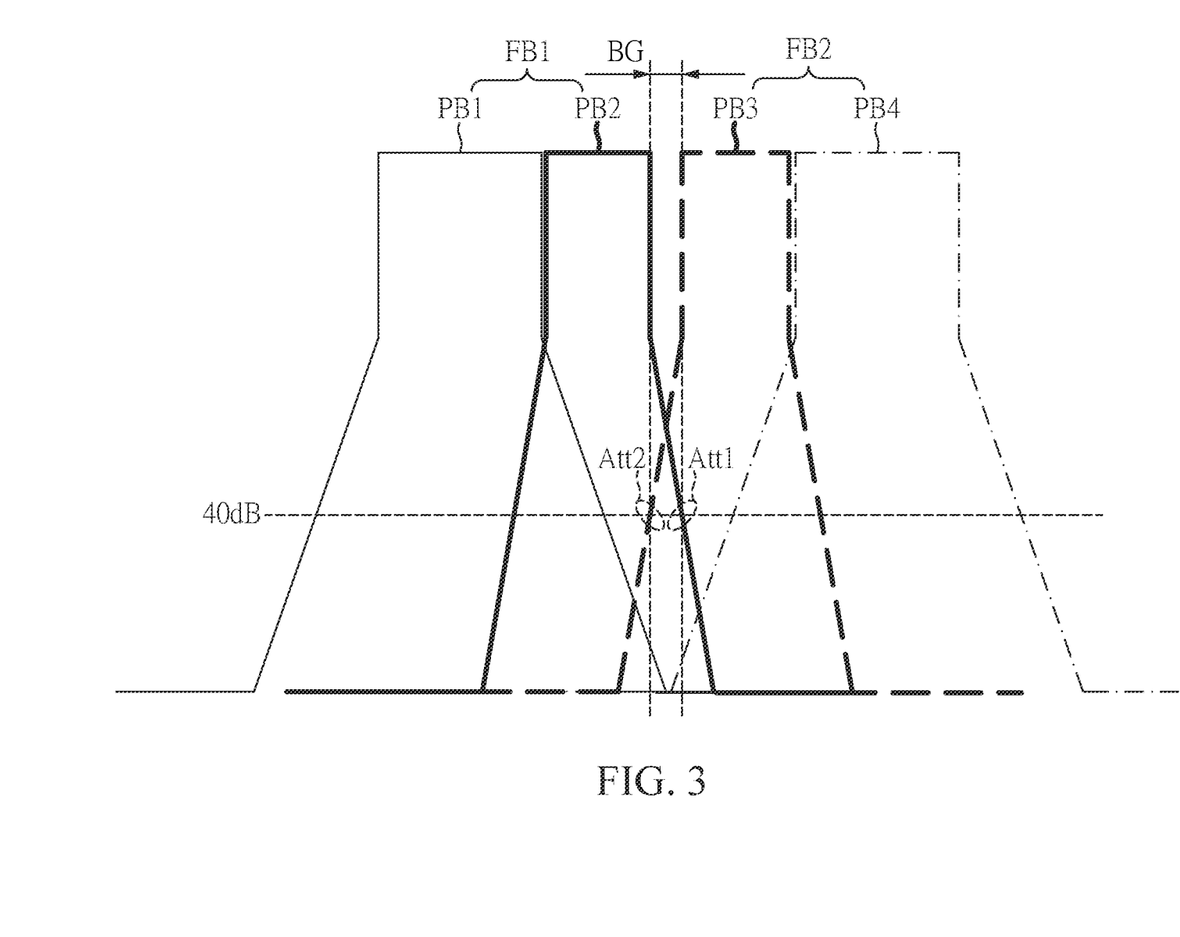
FIG. 3 is a schematic diagram of frequency bands of the first pass band, the second pass band, the third pass band, and the fourth pass band according to an embodiment of the present disclosure.

Referring to FIG. 3, which is a schematic diagram of frequency bands of the first pass band, the second pass band, the third pass band, and the fourth pass band according to an embodiment of the present disclosure. The first pass band PB1 has a lower frequency range than the second pass band PB2, and the first pass band PB1 and the second pass band PB2 are adjacent to jointly cover the first frequency band FB1.

The first frequency band FB1 may include the Unlicensed National Information Infrastructure (UNII) radio frequency bands UNII-1, UNII-2, UNII-3, and UNII-4 in the 5 GHz wireless frequency band as shown in FIG. 1. On the other hand, the second frequency band FB2, as shown in FIG. 1, includes the UNII radio frequency bands UNII-5, UNII-6, UNII-7 and UNII-8 in the 6 GHz wireless frequency band. Therefore, the first frequency band FB1 has a lower frequency range than the second frequency band FB2. The frequency range of the frequency band FB2, and there is a frequency band gap BG of 50 MHz between the first frequency band FB1 and the second frequency band FB2. The present disclosure can also be applied to WiFi 7 specifications to comply with a band gap BG lower than 50 MHz, for example: 30 MHz. In other words, the frequency band gap BG may be in the range of 30 MHz to 50 MHz, but the above is only an example, and the present disclosure is not limited to this.

Traditionally, a single wideband filter design is often used to cover the above-mentioned first frequency band. However, it is difficult to achieve an attenuation value exceeding 40 dB under a 50 MHz band gap. However, because the narrow-band filter has a higher Q value, it is easier to achieve a steep cut-off band change. Therefore, the present disclosure proposes a dual filter design, that is, a combination of a wideband filter and a narrowband filter is used to realize the pass band bandwidth and the attenuation value of the cutoff band required by the 5G and 6G dual band coexistence architecture.

Therefore, on this basis, the first pass band PB1 of the first filter 113 may have a wider frequency range than the second pass band PB2 of the second filter 114. In other words, since the second filter 114 is a narrowband filter relative to the first filter 113, the first filter 113 has a lower out-of-band attenuation slope value than the second filter 114. In more detail, the second filter 114 can reach the first out-of-band attenuation value Att1 at the junction of the frequency band gap BG and the second frequency band FB2.

In addition, in an embodiment of the present disclosure, the frequency range of the first pass band BP1 is at least 9.5 times the frequency range of the second pass band BP2, but this is only an example, and the present disclosure is not limited to this. In another embodiment of the present disclosure, the frequency range of the first pass band BP1 is 5150 to 5815 MHz, and the frequency range of the second pass band BP2 is 5815 to 5895 MHz. Under the above pass band conditions, the first out-of-band attenuation value Att1 is at least greater than 40 dB.

In addition, as shown in FIG. 2, the first switch circuit 112 has a first terminal t11, a second terminal t12, a third terminal t13, and a first control terminal c1. The first terminal t11 is connected to the first front-end module 111 through a coupler 117. The second terminal t12 is connected to the first filter 113, the third terminal t13 is connected to the second filter 114, the first control terminal c1 is connected to the processing circuit 100, and the processing circuit 100 is configured to selectively control the first terminal t11 to be connected to the second terminal t12 or the third terminal t13 through the first control terminal c1.

Similarly, the second switch circuit 115 has a first terminal t21, a second terminal t22, a third terminal t23, and a second control terminal c2. The first terminal t21 is connected to the first antenna 116, the second terminal t22 is connected to the first filter 113, the third terminal t23 is connected to the second filter 114, and the second control terminal c2 is connected to the processing circuit 100. The processing circuit 100 is configured to selectively control the first terminal t21 to be connected to the second terminal t22 or the third terminal t23 through the second control terminal c2.

Next, another part of the wireless communication system 1 will be described below. The second transceiver 120 is connected to the processing circuit 100, and the second transceiver 120 is configured to operate in a 6 GHz wireless frequency band, and may be, for example, a transceiver circuit for transmitting or receiving 6 GHz frequency band signals.

The second front-end module 121 is connected to the second transceiver 120. The second front-end module 121 may include multiple radio chains operating in the 6G frequency band, including one or more RF devices, and may include up/down converters, power combiners or splitters, and programmable phase shifting And power amplifier (PA), low noise amplifier (LNA), and control and power management circuits.

The third switch circuit 122 can be connected to the second front-end module 121 and the processing circuit 100 through the coupler 127, but the present disclosure is not limited to this, and the coupler 117 is not necessary. The third switch circuit 122 can be controlled by the processing circuit 100 to connect the second front-end module 121 to the third filter 123 or the fourth filter 124, and the third switch circuit 122 can be, for example, a single pole double throw, SPDT) switch circuit. The third switch circuit 122 is controlled by the processing circuit 100 to connect the second front-end module 121 to the third filter 123 or the fourth filter 124.

Referring to FIG. 2 again, the fourth switch circuit 125 is connected to the third filter 123, the fourth filter 124, the processing circuit 100 and the second antenna 126. Similarly, the fourth switch circuit 125 can also be, for example, a single pole double throw (SPDT) switch circuit, and the fourth switch circuit 125 is controlled by the processing circuit 100 to connect the second antenna 126 to the third filter 123 or fourth filter 124.

The third filter 123 is connected to the third switch circuit 122 and has a third pass band PB3, the fourth filter is connected to the third switch circuit 122 and has a fourth pass band PB4. The third filter 123 can be used to filter the transmitted signal from the second transceiver 120 or the received signal from the second antenna 126 with the third pass band PB3. The fourth filter 124 can also be used to filter the transmitted signal from the second transceiver 120 or the received signal from the second antenna 126 with the fourth pass band PB4.

Referring to FIG. 3, the third pass band PB3 has a lower frequency range than the fourth pass band PB4, and the third pass band PB3 and the fourth pass band PB4 are adjacent to jointly cover the second frequency band FB2. Similarly, for the 6G frequency band, a combination of a wideband filter and a narrowband filter is also used to achieve the attenuation value of the pass band bandwidth and cutoff band required by the 5G and 6G dual-band coexistence architecture.

On this basis, the fourth pass band PB4 of the fourth filter 124 may have a wider frequency range than the third pass band PB3 of the third filter 123. In other words, since the third filter 123 is a narrowband filter relative to the fourth filter 124, the fourth filter 124 has a lower out-of-band slope attenuation value than the third filter 123. In more detail, the third filter 123 can reach the second out-of-band attenuation value Att2 at the junction of the band gap BG and the first frequency band FB1.

In addition, in an embodiment of the present disclosure, the frequency range of the fourth pass band BP4 is at least 6.375 times the frequency range of the third pass band BP3, but this is only an example, and the present disclosure is not limited to this. In another embodiment of the present disclosure, the frequency range of the third pass band BP3 is 5945 to 6105 MHz, and the frequency range of the fourth pass band BP4 is 6105 to 7125 MHz. Under the above pass band conditions, the second out-of-band attenuation value Att2 is at least greater than 40 dB.

In addition, as shown in FIG. 2, the third switch circuit 122 has a first terminal t31, a second terminal t32, a third terminal t33, and a third control terminal c3. The first terminal t31 is connected to the second front-end module 121 through the coupler 127. The second terminal t32 is connected to the third filter 123, the third terminal t33 is connected to the fourth filter 124, and the third control terminal c3 is connected to the processing circuit 100. The processing circuit 100 is configured to selectively control the first terminal t31 to be connected to the second terminal t32 or the third terminal t33 through the third control terminal c3.

Similarly, the fourth switch circuit 125 has a first terminal t41, a second terminal t42, a third terminal t43, and a second control terminal c4. The first terminal t41 is connected to the second antenna 126, the second terminal t42 is connected to the third filter 123, the third terminal t43 is connected to the fourth filter 124, and the fourth control terminal c4 is connected to the processing circuit 100. The processing circuit 100 is configured to selectively control the first terminal t41 to be connected to the second terminal t42 or the third terminal t43 through the fourth control terminal c4.

Figure 4:
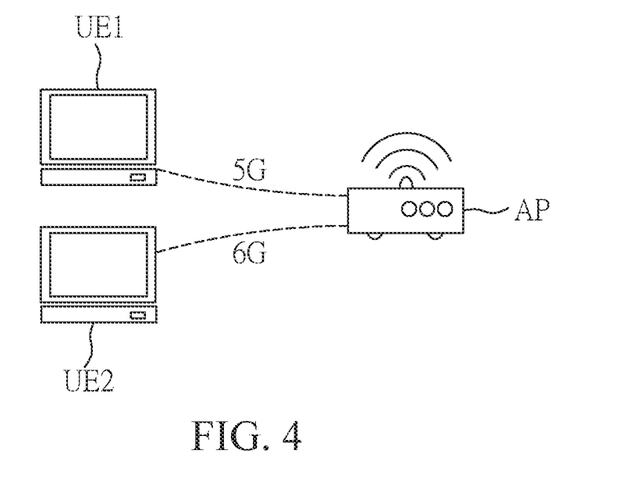
FIG. 4 is a schematic diagram of a wireless access point connecting to user equipment and performing channel selection according to an embodiment of the present disclosure.
Figure 5:
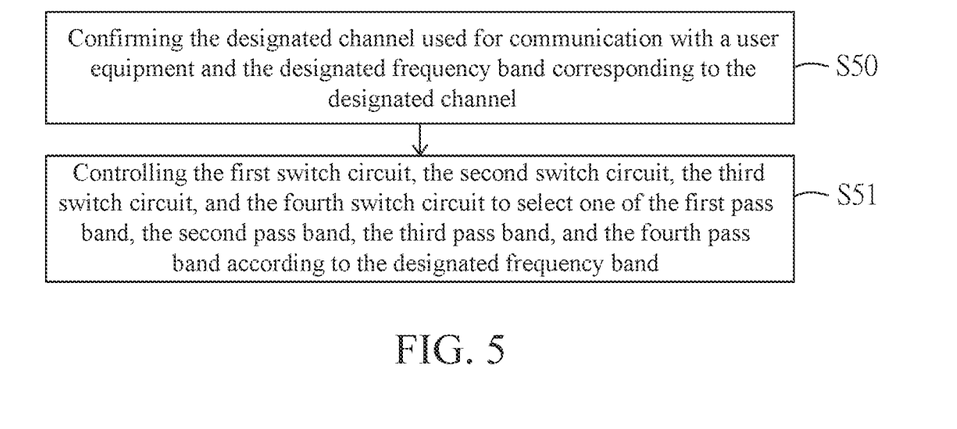
FIG. 5 is a flowchart of a channel selection procedure according to an embodiment of the present disclosure.

Referring to FIGS. 4 and 5. FIG. 4 is a schematic diagram of a wireless access point connected to user equipment and performing channel selection according to an embodiment of the present disclosure. FIG. 5 is a flowchart of a channel selection procedure according to an embodiment of the present disclosure.

As shown in FIG. 4, the wireless access point AP includes the wireless communication system 1 according to the embodiment of the present disclosure, and in this scenario, the wireless access point AP communicates with the user equipment UE1 and UE2 respectively. At this time, the processing circuit 100 is configured to execute the channel selection procedure, including the following steps:

Step S50: confirming the designated channel used for communication with user equipment and the designated frequency band corresponding to the designated channel.

Step S51: controlling the first switch circuit, the second switch circuit, the third switch circuit, and the fourth switch circuit to select one of the first pass band, the second pass band, the third pass band, and the fourth pass band according to the designated frequency band.

In an example, when the processing circuit 100 confirms that it uses the 5G frequency band for communication with the user equipment UE1, and the designated channel used is within the first pass band PB1, at this time, the processing circuit 100 controls the first terminal t11 of the first switch circuit 112 being connected to the second terminal t12, and controls the first terminal t21 of the second switch circuit 115 being connected to the second terminal t22.

In another example, when the processing circuit 100 confirms that it communicates with the user equipment UE1 using the 5G frequency band, and the designated channel used is within the second pass band PB2, at this time, the processing circuit 100 controls the first terminal t11 of the first switch circuit 112 being connected to the third terminal t13, and controls the first terminal t21 of the second switch circuit 115 being connected to the third terminal t23.

In an example, when the processing circuit 100 confirms that it uses the 6G frequency band for communication with the user equipment UE2, and the designated channel used is within the third pass band PB3, at this time, the processing circuit 100 controls the first terminal t31 of the first switch circuit 112 being connected to the second terminal t32, and controls the first terminal t41 of the fourth switch circuit 125 being connected to the second terminal t42. In another example, when the processing circuit 100 confirms that it uses the 6G frequency band for communication with the user equipment UE2, and the designated channel used is within the fourth pass band PB4, at this time, the processing circuit 100 controls the first terminal t31 of the third switch circuit 112 being connected to the second terminal t33, and controls the first terminal t41 of the fourth switch circuit 125 being connected to the second terminal t43.

It should be noted that the user equipment UE1 and UE2 can communicate with the wireless access point AP at the same time, and the user equipment UE1 and UE2 can communicate in the same pass band through time division multiplexing, that is, it is not limited to communicate in 5G and 6G frequency bands respectively.

One of the beneficial effects of the present disclosure is that the wireless communication system having a dual-band coexistence architecture provided by the present disclosure can realize the pass band bandwidth required by the dual-band coexistence architecture by using a combination of a wideband filter and a narrowband filter and the attenuation value of the cutoff band.

In addition, the wireless communication system with dual-band coexistence architecture provided by the present disclosure can support UNII-4, achieving an attenuation value greater than 40 dB under the condition that the pass band interval is only 50 MHz, thereby avoiding coexistence of 5G and 6G pass bands interfering with each other.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A wireless communication system having a dual-band coexistence architecture, comprising:
a processing circuit;
a first transceiver connected to the processing circuit;
a first front-end module connected to the first transceiver;
a first switch circuit connected to the first front-end module and the processing circuit;
a first filter connected the first switch circuit and having a first pass band;
a second filter connected the first switch circuit and having a second pass band, wherein the first pass band has a lower frequency range than the second pass band, the first pass band and the second pass band are adjacent to jointly cover a first frequency band, and the first switch circuit is controlled by the processing circuit to connect the first front-end module to the first filter or the second filter;
a second switch circuit connected to the first filter, the second filter, and the processing circuit;

a first antenna connected to the second switch circuit, wherein the second switch circuit is controlled by the processing circuit to connect the first antenna to the first filter or the second filter;

a second transceiver connected to the processing circuit;

a second front-end module connected to the second transceiver;

a third switch circuit connected to the second front-end module and the processing circuit;

a third filter connected to the third switch circuit and having a third pass band;

a fourth filter connected to the third switch circuit and having a fourth pass band, wherein the third pass band has a lower frequency range than the fourth pass band, the third pass band is adjacent to the fourth pass band to jointly cover a second frequency band, the second frequency band has a higher frequency range than the first frequency band, and the third switch circuit is controlled by the processing circuit to connect the second front-end module to the third filter or the fourth filter;

a fourth switch circuit connected to the third filter, the fourth filter, and the processing circuit; and a second antenna connected to the fourth switch circuit, wherein the fourth switch circuit is controlled by the processing circuit to connect the second antenna to the third filter or the fourth filter;

wherein there is a band gap between the first frequency band and the second frequency band, the second filter has a first out-of-band attenuation value at a junction of the band gap and the second frequency band, and the third filter has a second out-of-band attenuation value at a junction of the band gap and the first frequency band;

wherein the processing circuit is configured to execute a channel selection procedure, including:

confirming a designated channel used for communication with user equipment and a designated frequency band corresponding to the designated channel; and controlling the first switch circuit, the second switch circuit, the third switch circuit, and the fourth switch circuit to select one of the first pass band, the second pass band, the third pass band, and the fourth pass band according to the designated frequency band.

2. The wireless communication system according to claim 1, wherein the first pass band has a wider frequency range than the second pass band and the third pass band has a narrower frequency range than the fourth pass band.

3. The wireless communication system according to claim 2, wherein the frequency range of the first pass band is at least 9.5 times the frequency range of the second pass band and the frequency range of the fourth pass band is at least 6.375 times the frequency range of the third pass band.

4. The wireless communication system according to claim 2, wherein the first filter has a first out-of-band slope attenuation value, the second filter has a second out-of-band slope attenuation value, and the first out-of-band slope attenuation value is lower than the second out-of-band slope attenuation value; wherein the third filter has a third out-of-band slope attenuation value, the fourth filter has a fourth out-of-band slope attenuation value, and the fourth out-of-band slope attenuation value is lower than the third out-of-band slope attenuation value.

5. The wireless communication system according to claim 1, wherein the first out-of-band attenuation value and the second out-of-band attenuation value are at least greater than 40 dB.

6. The wireless communication system according to claim 1, wherein the first transceiver is configured to operate in a 5 GHz wireless frequency band and the second transceiver is configured to operate in a 6 GHz wireless frequency band.

7. The wireless communication system according to claim 6, wherein the first frequency band includes the Unlicensed National Information Infrastructure (UNII) radio frequency bands UNII-1, UNII-2, UNII-3, and UNII-4 in 5 GHz wireless frequency band, and the second frequency band includes the UNII radio frequency bands UNII-5, UNII-6, UNII-7, and UNII-8 in 6 GHz wireless frequency band.

8. The wireless communication system according to claim 7, wherein the band gap is in a range of 30 MHz to 50 MHz.

9. The wireless communication system according to claim 1, wherein the first switch circuit has a first terminal, a second terminal, a third terminal, and a first control terminal, the first terminal of the first switch circuit is connected to the first front-end module, and the second terminal of the first switch circuit is connected to the first filter, the third terminal of the first switch circuit is connected to the second filter, the first control terminal is connected to the processing circuit, and the processing circuit is configured to selectively control the first terminal of the first switch circuit to connect to the second terminal of the first switch circuit or the third terminal of the first switch circuit through the first control terminal;

wherein the second switch circuit has a first terminal, a second terminal, a third terminal, and a second control terminal, the first terminal of the second switch circuit is connected to the first antenna, and the second terminal of the second switch circuit is connected to the first filter, the third terminal of the second switch circuit is connected to the second filter, the second control terminal is connected to the processing circuit, and the processing circuit is configured to selectively control the first terminal of the second switch circuit to connect to the second terminal of the second switch circuit or the third terminal of the second switch circuit through the second control terminal.

10. The wireless communication system according to claim 9, wherein the channel selection procedure further comprises:

in response to the designated frequency band being within the first pass band, controlling the first terminal of the first switch circuit being connected to the second terminal of the first switch circuit and controlling the first terminal of the second switch circuit being connected to the second terminal of the second switch circuit; and in response to the designated frequency band being within the second pass band, controlling the first terminal of the first switch circuit being connected to the third terminal of the first switch circuit and controlling the first terminal of the second switch circuit being connected to the third terminal of the second switch circuits.

11. The wireless communication system according to claim 1, wherein the third switch circuit has a first terminal, a second terminal, a third terminal, and a third control terminal, the first terminal of the third switch circuit is connected to the second front-end module, and the second terminal of the third switch circuit is connected to the third filter, the third terminal of the third switch circuit is connected to the fourth filter, the third control terminal is connected to the processing circuit, and the processing circuit is configured to selectively control the first terminal of the third switch circuit to connect to the second terminal of the third switch circuit or the third terminal of the third switch circuit through the third control terminal;

wherein the fourth switch circuit has a first terminal, a second terminal, a third terminal, and a fourth control terminal, the first terminal of the fourth switch circuit is connected to the second antenna, and the second terminal of the fourth switch circuit is connected to the third filter, the third terminal of the fourth switch circuit is connected to the fourth filter, the fourth control terminal is connected to the processing circuit, and the processing circuit is configured to selectively control the first terminal of the fourth switch circuit to connect to the second terminal of the fourth switch circuit or the third terminal of the fourth switch circuit through the fourth control terminal.

12. The wireless communication system according to claim 11, wherein the channel selection procedure further comprises:

in response to the designated frequency band being within the third pass band, controlling the first terminal of the third switch circuit being connected to the second terminal of the third switch circuit and controlling the first terminal of the fourth switch circuit being connected to the second terminal of the fourth switch circuit; and in response to the designated frequency band being within the fourth pass band, controlling the first terminal of the third switch circuit being connected to the third terminal of the third switch circuit and controlling the first terminal of the fourth switch circuit being connected to the third terminal of the fourth switch circuit.

\* \* \* \* \*